United States Patent Office 3,531,513
Patented Sept. 29, 1970

3,531,513
OIL-SOLUBLE ACYLATED HYDROXYL-CONTAIN-
ING DIENE POLYMERS HAVING AT LEAST ONE
PRIMARY, TERMINAL, ALLYLIC ACYL GROUP
Donald D. Carlos, Crown Point, Ind., and Robert R.
Chambers, Chicago, and David W. Young, Homewood,
Ill., assignors to Sinclair Research, Inc., New York,
N.Y., a corporation of Delaware
No Drawing. Original application Nov. 25, 1966, Ser. No.
596,791, now Patent No. 3,449,252, dated June 10,
1969. Divided and this application Jan. 9, 1969, Ser.
No. 801,906
Int. Cl. C07c 69/16, 69/78
U.S. Cl. 260—476     11 Claims

ABSTRACT OF THE DISCLOSURE

Oil-soluble acylated hydroxyl-containing diene polymers are provided having a Staudinger molecular weight of about 240 to 25,500 and having an unsaturated hydrocarbon backbone chain with primary terminal, allylic hydroxyl groups separated by the unsaturated carbon-carbon backbone chain, at lease one of the terminal hydroxyl groups being acylated with an aliphatic or aromatic hydrocarbon acyl group, such as acetyl, propionyl or benzoyl. The hydroxyl-containing diene polymer has an average of greater than two predominantly primary, terminal, allylic hydroxyl groups per polymer molecule and is an addition polymer of a 1,3-diene of 4 to 12 carbon atoms, such as 1,3-butadiene, and has more than 50% of its unsaturation in the chain. These oil-soluble acylated hydroxyl-containing diene polymers when added in small amounts to a base mineral oil are effective as cutting oil compositions in machining aluminum and copper, especially in reducing torque and improving surface finish.

This application is a division of our application Ser. No. 596,791, filed Nov. 25, 1966, now U.S. Pat. No. 3,449,-252, issued June 10, 1969.

This invention relates to a novel diene polymer product and to oil compositions, especially cutting oil compositions containing such product and suitable for use when cutting metals such as aluminum and copper.

The steady increase in the use of such metals as aluminum and copper in numerous industries over the past five years has made it necessary to find ways of machining these metals with improved efficiency. In the past, efforts to machine metals such as aluminum and copper have centered around the use of light viscosity, kerosene-type, nonadditive oils. Light fluids were necessary because conventional cutting oils containing sulfur, phosphorus and other extreme pressure additives stained and gave a poor finish to the aluminum and copper.

It has recently been shown that certain olefinic substances are exceptionally effective in machining metal such as aluminum and copper. The reason for this effectiveness is not known for certain. However, it is thought that a metal-olefin complex is formed during the cutting operation and that this effect leads to reduced feed force and improved surface finish.

We have now found that base oil-soluble polymeric products obtained by the acylation of hydroxy-containing diene polymers when added to a base mineral oil in sufficient amounts are effective when cutting aluminum and copper metals, especially in reducing torque and improving surface finish. The hydrocarbon nature of the diene polymer backbone permits blends to be made with a variety of base oil stocks. Further, because of the microstructure of these diene polymer oils, they do not show undue drying rates and thus present no serious storage problems. In general, the diene polymer product-containing cutting oils of the present invention can be used in a wide range of machining operations such as drawing, extruding, tapping, reaming, broaching, grinding, threading, etc.

The diene polymers acylated to produce the novel additive of the invention generally have on the average at least about 1.8 predominantly primary, terminal, i.e., attached to a terminal carbon atom, hydroxyl groups per polymer molecule. Most advantageously, the polymer has greater than two average allylic, terminal hydroxyl groups, e.g., at least 2.1 to say 2.6, or even 3 or more. Also, two terminal hydroxyls are generally separated by a long carbon-carbon chain. Determined as milli-equivalents of potassium hydroxide equivalent to the hydroxyl content of one gram of polymer, the diene polymers will often have a hydroxyl value of about 0.5 to 1.5, preferably 0.7 to 1.0. The hydroxyl-containing diene polymers used in the present invention may have number average molecular weights in the range of about 200 to 25,000 (Staudinger) and viscosities at 30° C. of about 5 to 20,000 poises. The preferred polymers will be in the molecular weight range of about 1200 to 7000 with viscosities at 30° C. of about 15 to 5000 poises. The preferred diene polymers also have the majority of their unsaturation in the main hydrocarbon chains.

The dienes which are employed to make the hydroxyl-containing polymers are unsubstituted or substituted, e.g., 2-substituted or 2,3-disubstituted, 1,3-dienes of up to about 12 carbon atoms. The diene preferably has up to 6 carbon atoms. Typical dienes which may be employed are 1,3-butadiene, isoprene, chloroprene, 2-cyano-1,3-butadiene, 2,3-dimethyl-1,3-butadiene, etc.

Mono-olefinically unsaturated monomers may also be incorporated into the diene polymers used in this invention. Generally, they will be present only in minor amounts, say up to about 40 percent by weight of the total monomers. Usable vinylidene monomers include alpha-mono-olefinic materials of about 2 or 3 to 10 or 12 carbon atoms such as styrene, vinyl toluene, methyl methacrylate, methacrylate, acrylic esters, acrylonitrile, vinyl chloride, etc.

The number and location of the hydroxyl groups and the molecular weight of the diene polymer may be a function of polymerization temperature and the type of addition polymerization system employed in forming the polymer. It has been found that diene polymers of the desired configuration may be obtained using hydrogen peroxide as the catalyst for polymerization. This free-radical addition polymerization usually takes place in a mutual solvent system; that is, one which dissolves both the diene monomer and the hydrogen peroxide. Suitable solvents are isopropanol, acetone, methanol, sec-butanol, n-butanol, n-propanol and like alcohols having 2 to about 12 carbon atoms. The $H_2O_2$-solvent system is found to supply hydroxyl groups and the catalytic and solvent effects needed to produce the diene polymers of desired chemical and physical characteristics. In such a polymerization system, the alcohol serves as a solvent for the peroxide and as a solvent or diluent for the diene monomer and is used in an amount suitable to promote adequately rapid but controllable polymerization of the monomer material in the solution to form the diene polymer. The alcohol will be free of any group which would interfere with the production of the diene polymer. Saturated alcohols are preferred and often those having about the same carbon atom content as the diene monomer will be found most useful. For example, when the monomer is butadiene, propanol or isopropanol may be preferred. The $H_2O_2$-alcohol system may also contain ketones, ethers, alcohol-ketones, alcohol-ethers and alcohol-esters which are miscible in water in all proportions and which do not contain polymerizable carbon-to-carbon unsaturation or otherwise interfere with polymerization or enter into the product. The peroxide material may be used in amounts of about 1 to 10 percent of the reaction mixture to assure a low molecular weight addition polymer product having the desired number of hydroxyl groups per molecule.

By the above-described polymerization method, polymers, especially in the above-indicated molecular weight ranges, are produced from diene monomers in which aqueous hydrogen peroxide is virtually insoluble. If the monomer material is merely mixed with aqueous hydrogen peroxide, then two phases result and only a very small amount of solid polymer is produced at the interface between them. However, when there is combined with an appropriate amount of aqueous hydrogen peroxide an appropriate proportion of mutual solvent-diluent, then this combination when added to butadiene, for example, forms a clear homogeneous solution therewith and at elevated temperature, e.g., above 100° C., preferably about 115 to 200° C., polymerization is initiated which can be controlled to maintain the polymerization at desired temperature, to obtain in say 1 to 4 hours a conversion of from about 40% to about 60% of the monomer to polymer. The product, when freed of unreacted and residual materials, is a clear-white, viscous liquid polybutadiene predominantly of 1,4 configuration.

To cite an example of the chemical structure of the preferred diene polymer useful in this invention, a simplified structural formula of polybutadiene may be given as:

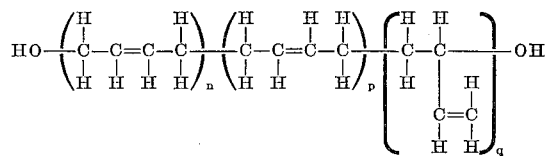

in which $n$ plus $p$ is greater than $q$, that is, the in-chain unsaturation accounts for more than 50% of the unsaturation. One or more of the H atoms appearing in the above formula will be replaced by hydroxyl in at least some of the molecules. This formula should not be understood as implying that the polymers are necessarily in blocks, but the cis-1,4-, trans-1,4- and vinyl (1,2) unsaturation are usually distributed throughout the polymer molecule. The letter $n$ may be a number sufficient to give a cis-1,4-unsaturation content of about 10–30 percent; $p$ may be a number sufficient to give a trans-1,4-saturation content to the polymer in the range of about 40–70 percent while $q$ may be sufficient to give a pendant 1,2-vinyl-unsaturation of about 10–35 percent. Often the polymer will contain largely trans-1,4-units, e.g., about 50–65 percent and about 15–25 percent cis-1,4-units, with about 15–25 percent 1,2-units. Branching may also occur in the above polymers, especially those prepared at higher temperatures. It should be emphasized, however, that the present invention is not necessarily limited to the use of hydroxyl-containing diene polymers having the predominating trans-1,4-structure, although such are highly preferred, where otherwise suitable polymers having high cis-1,4-forms are available.

Acylation of the hydroxyl-containing diene polymers may be performed using compounds that contain at least one acyl group, the acyl group having the structure

wherein R is a hydrocarbon radical having up to about 20, preferably up to about 6 carbon atoms, e.g., aliphatic, including cycloaliphatic, aromatic or mixed aliphatic-aromatic. Such compounds will hereinafter be designated by the term acylating agents or substituents. The preferred acylating substituents to be used in preparing the novel polymeric products may be represented by the structure

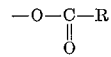

wherein X is a halogen, —OH, or

and R is as defined above. The compounds useful as acylating substituents include, for example, acetyl chloride, propionyl chloride, benzoyl chloride, etc.

The acylation reaction can be performed without the aid of a catalyst at room temperature with mechanical stirring of the reagents, for example, for at least about 2 hours. The acylation may also be performed at elevated temperatures or with the aid of a catalyst to hasten the reaction. A solvent such as tetrachloroethane, ethylene dichloride, etc., may be employed also, if desired. The term acylation, as it is used in this invention, is meant to designate the process whereby ester linkages are formed between the acyl groups are defined above and the oxygen atoms of the hydroxyl groups on the diene polymer molecule. The proportion of acylating substituent to be used in relation to the diene polymer may vary according to the hydroxyl content of the polymer and the molecular weight of the particular acylating substituent employed, but a molar ratio of acylating substituent to polymer of at least about 2:1 may be employed.

The number of acyl groups per polymer molecule of the novel polymeric products obtained from the acylation of the hydroxyl-containing diene polymers may vary according to the particular diene polymer acylated. Generally, the novel polymer products will have at least 1 predominantly primary, terminal acyl group per polymer molecule and Staudinger molecular weights of about 240 to 25,000. Preferably, the novel products are at least about 50% acylated, based upon the number of the hydroxyl groups of the polymer.

The oils used as the base and major component in the cutting oils of the present invention are mineral lubricating oils. The oils used include the petroleum lubricating oils such as refined coastal oils and refined Mid-Continent oils. The oils may be refined by acid treatment, solvent extraction, hydrogenation or other procedures. Although various oils of lubricating viscosity can be used in the products of our invention, it is preferred to use a substantially anhydrous lubricating oil with a viscosity from about 50 to 2000 SUS at 100° F., preferably 70 to 500 SUS at 100° F. Good results have been obtained with an acid-refined coastal oil with a viscosity of about 100 SUS at 100° F.

The amount of the novel diene polymer to be added to the base oil employed may depend upon the particular base oil employed and the machining operation in which the cutting oil is used. However, in all cases the amount will be that sufficient to enhance cutting, for example, effectively reduce feed force. Often the amounts will fall within the range of about 1 to 50 by weight, preferably about 2 to 20 by weight, based on the mineral oil.

The following example will further illustrate our invention, but is not to be considered limiting.

EXAMPLE

To a glass bottle containing 10 parts of aqueous (50% by weight) hydrogen peroxide were added 70 parts isopropanol and 100 parts butadiene-1,3. The bottle was capped and placed in a steam pressure chamber and held at 118° C. for two hours. After cooling, the bottle was opened and the volatiles were removed, e.g., butadiene-1,3, butadiene dimer, isopropanol, acetone, residual hydrogen peroxide, water, etc. This removal was accomplished with the aid of heat and vacuum followed by steam and vacuum. The resulting product was a clear, viscous liquid polybutadiene having a hydroxyl value of 0.95 meq./g., about 2.2 terminal, allylic hydroxyl groups (predominantly primary) per molecule, a molecular weight of approximately 2200, a viscosity of 50 poises, and an iodine number of over 300.

To a one liter fluted, round bottom flask equipped with a reflux condenser attached to a $CaCl_2$ drying tube, were added 340 g. of the polybutadiene oil prepared above and 150 cc. of acetyl chloride and the mixture was mechanically stirred at room temperature until HCl evolution had ceased (approximately 1½ hours). The excess acetyl chloride was removed under reduced pressure and there was obtained 353 g. (quantitative yield) of pale yellow oil. The infrared spectrum (neat) of the product showed the absence of —OH absorption in the 3 micron region and the presence of carbonyl absorption at 5.73 microns.

The acylated product thus obtained was evaluated for torque reduction by adding a small amount of the product to a mineral oil base stock and subjecting the resulting mixture to a metal tapping test. Tapping tests were run using both aluminum and copper metals. For comparison, test runs were made initially using the mineral oil base without the addition of any acrylated polymer product. The base mineral oil used in the tests is an acid refined coastal mineral lubricating oil having a viscosity of 100 SUS at 100° F. The results are listed below.

ALUMINUM TAPPING TEST RESULTS

|  | Torque in inch-pounds | | |
| --- | --- | --- | --- |
|  | Tap No. 1 | Tap No. 2 | Tap No. 3 |
| Acid refined coastal oil (100 SUS at 100° F.) | 379 | 332 | 392 |
| 5% of acylated diene polymer in acid refined coastal oil (100 SUS at 100° F.) | 281 | 280 | 279 |

COPPER TAPPING TEST RESULTS

|  | Torque in inch-pounds |
| --- | --- |
| Acid refined coastal oil (100 SUS at 100° F.) | 315 |
| 5% of acylated diene polymer in acid refined coastal oil (100 SUS at 100° F.) | 227 |

Notable torque reduction with both copper and aluminum is effected when a small amount of the acylated diene polymer product is added to the base mineral oil. Different acylated diene polymer product concentrations and base mineral oil stock variations may be desirable, however, when the cutting oil compositions are used in different industrial machining operations, such as drawing or extruding.

It is claimed:
1. An oil-soluble, acylated, hydroxyl-containing diene polymer having a Staudinger molecular weight of about 240 to 25,500, said hydroxyl-containing diene polymer having an average of greater than two predominantly primary, terminal, allylic hydroxyl groups per polymer molecule and being produced by addition polymerization of a 1,3-alkadiene of 4–12 carbon atoms in the presence of hydrogen peroxide dissolved in an alcohol or ketone or in mixtures of an alcohol and a ketone or ester or ether and having a backbone of a carbon-carbon chain separating said two terminal hydroxyls with more than 50% of the polymer unsaturation in said chain, said hydroxyl-containing diene polymer being at least 50% acylated forming an ester linkage between an acyl group and the oxygen atom of a hydroxyl group thereby providing at least one terminal, allylic acyl group per polymer molecule, said acyl group having the structure

wherein R is alkyl of up to about 20 carbon atoms or phenyl.

2. An oil-soluble acylated hydroxyl-containing diene polymer of claim 1 wherein said 1,3-alkadiene is 1,3-butadiene.
3. An oil-soluble acylated hydroxyl-containing diene polymer of claim 1 wherein R in said acyl group is alkyl of up to about 6 carbon atoms or phenyl.
4. An oil-soluble acylated hydroxyl-containing diene polymer of claim 1 wherein said acyl group is acetyl, propionyl or benzoyl.
5. An oil-soluble acylated hydroxyl-containing diene polymer of claim 2 wherein said acyl group is acetyl, propionyl or benzoyl.
6. An oil-soluble acylated hydroxyl-containing diene polymer of claim 1 wherein the hydroxyl-containing diene polymer has a trans-1,4-unsaturation of about 40–70 percent, a cis-1,4-unsaturation of about 10–30 percent and a pendant 1,2-vinyl unsaturation of about 10–35 percent.
7. An oil-soluble acylated hydroxyl-containing diene polymer of claim 2 wherein the hydroxyl-containing diene polymer is obtained by addition polymerization of 1,3-butadiene in solution in a saturated alcohol of 2 to 12 carbon atoms containing hydrogen peroxide dissolved therein.
8. An oil-soluble acylated hydroxyl-containing diene polymer having a Staudinger molecular weight of about 240 to 25,500, said hydroxyl-containing diene polymer having an average of greater than two predominantly primary, terminal, allylic hydroxyl groups per polymer molecule and being produced by addition polymerization of a 1,3-alkadiene of 4–12 carbon atoms in the presence of hydrogen peroxide dissolved in an alcohol or ketone or a mixture of an alcohol and a ketone or ester or ether and having a backbone of a carbon-carbon chain separating said two terminal hydroxyls with more than 50% of the polymer unsaturation in said chain, said hydroxyl-containing diene polymer being 50% acylated forming an ester linkage between an acyl group and the oxygen atom of a hydroxyl group thereby providing one terminal, allylic acyl group and at least one terminal, allylic hydroxyl group per polymer molecule, said acyl group having the structure

wherein R is alkyl of up to about 6 carbon atoms or phenyl.

9. An oil-soluble acylated hydroxyl-containing diene polymer of claim 8 wherein said 1,3-alkadiene is 1,3-butadiene.
10. An oil-soluble acylated hydroxyl-containing diene polymer of claim 8 wherein said acyl group is acetyl, propionyl or benzoyl.
11. An oil-soluble acylated hydroxyl-containing diene polymer of claim 9 wherein said acyl group is acetyl, propionyl or benzoyl.

References Cited

UNITED STATES PATENTS

| 2,500,121 | 3/1950 | Dickey et al. | 260—488 |
| 2,533,938 | 12/1950 | Jenner | 260—488 |
| 2,692,892 | 10/1954 | Hillyer et al. | 260—488 |
| 2,834,747 | 5/1958 | Short et al. | 260—488 |

LORRAINE A. WEINBERGER, Primary Examiner

V. GARNER, Assistant Examiner

U.S. Cl. X.R.

252—56, 57; 260—410.6, 465.4, 468, 486, 488, 497, 635